Figure 1:
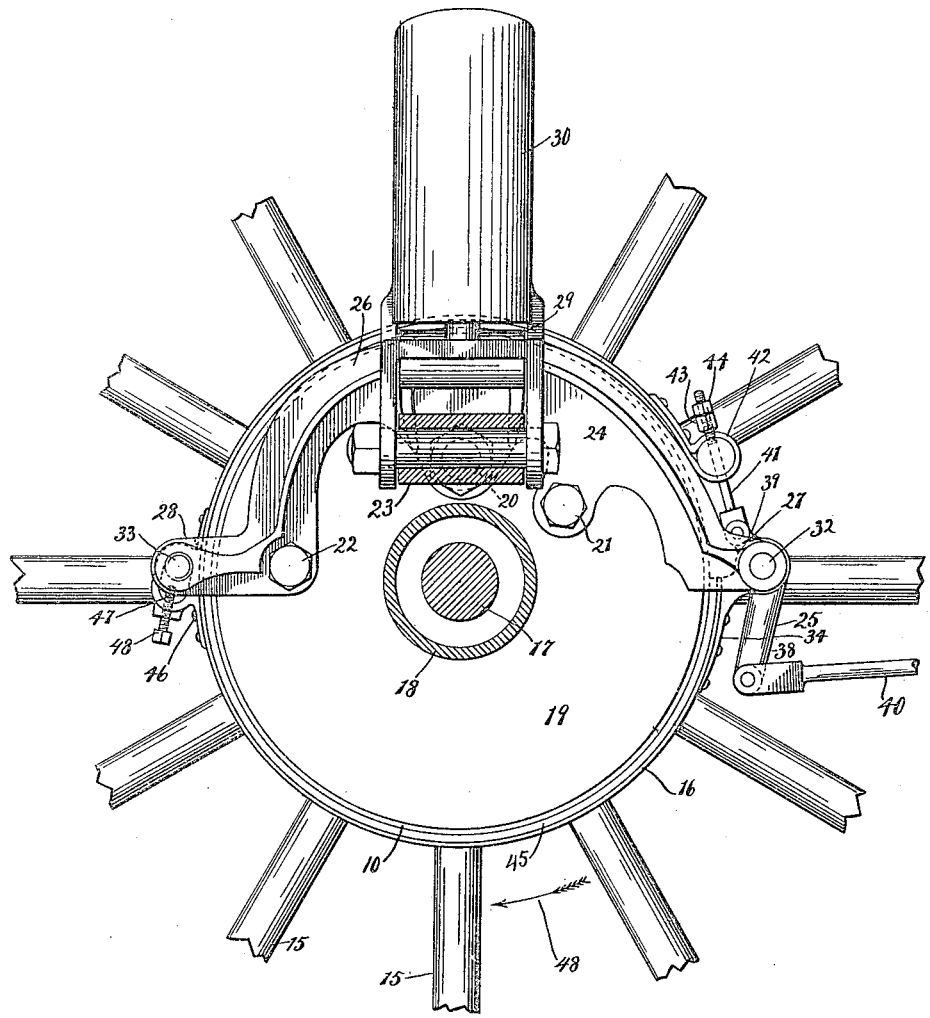

F. DENMAN.
VEHICLE BRAKE.
APPLICATION FILED SEPT. 11, 1915.

1,213,597.

Patented Jan. 23, 1917.
2 SHEETS—SHEET 1.

Inventor:
Frederick Denman

By Gillson & Gillson Attys.

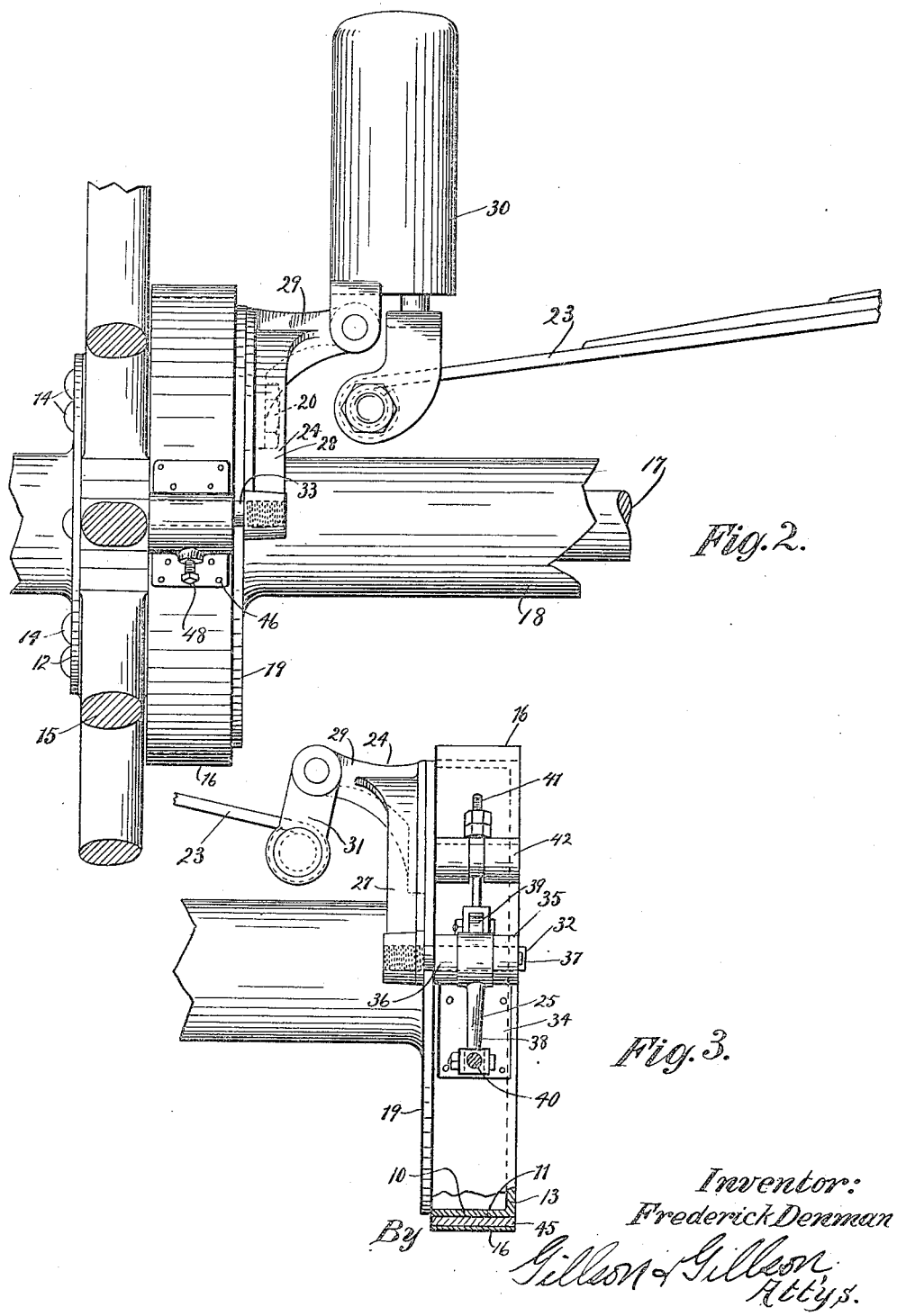

UNITED STATES PATENT OFFICE.

FREDERICK DENMAN, OF SEATTLE, WASHINGTON.

VEHICLE-BRAKE.

1,213,597.  Specification of Letters Patent.  Patented Jan. 23, 1917.

Application filed September 11, 1915. Serial No. 50,249.

*To all whom it may concern:*

Be it known that I, FREDERICK DENMAN, a citizen of the United States, and resident of Seattle, county of King, and State of Washington, have invented certain new and useful Improvements in Vehicle-Brakes, of which the following is a specification and which are illustrated in the accompanying drawings, forming a part thereof.

The invention relates to vehicle brakes and more particularly to a service brake adapted to be directly associated with the vehicle wheels.

The object of the invention is to provide a vehicle brake which shall be efficient in operation without in any wise interfering with the free movement of the vehicle when not in use and which shall be of simple and durable construction.

A feature of the invention provides a construction which may be readily applied to vehicles already in use and which, when applied, may serve the added function of providing perches for connection with the vehicle springs or shock absorbing devices.

In the accompanying drawings, Figure 1 is a detail sectional view of a vehicle to which the brake is applied, the section being through the vehicle axle and the direction of view being such as to show the parts at the left side of the vehicle, Fig. 2 is a detail rear elevation of the parts shown in Fig. 1, the spokes of the vehicle wheel being shown in section, Fig. 3 is a front elevation of the parts illustrated in Fig. 1, the vehicle wheel being omitted and a different manner of connecting the vehicle spring being shown.

In carrying out the invention a drum 10 is provided and is preferably secured directly against the vehicle wheel, as 12. In the arrangement shown, the drum 10 has a smooth rim 11 and a flat side 13, the latter being placed against the spokes 15 of the wheel 12 and secured thereto by bolts 14. A friction band 16 extends about the drum 10 and provision is made for tightening the band 16 upon the rim 11 of the drum, when a braking action is desired.

The parts provided for supporting the friction band 16 and means for operating the same are shown as taking a form which may be readily applied to a well known type of automobile having its rear axle 17 extended through a tubular housing 18. In the particular automobile to which reference is made, the end of the housing 18, adjacent the wheel 12, is flanged outwardly forming a substantially flat disk 19, and this disk has threaded openings for receiving attaching bolts, as 20, 21, 22.

In carrying out the present invention, the bolts 20, 21, 22 are employed for the attachment of a special form of bracket 24 which provides both a spring perch for connection with the vehicle spring 23 and a guiding support for the friction band 16 and its operating lever, as 25. Preferably the bracket 24 is so constructed as to include an intermediate part 26, which arches over the axle 17, and forwardly and rearwardly projecting end portions 27 and 28. The intermediate portion 26 is formed with an inwardly projecting arm 29 which serves as the spring perch heretofore mentioned. In the arrangement shown in Figs. 1 and 2, this spring perch is connected with the vehicle spring 23, through a well known form of shock absorbing device 30. In the arrangement shown in Fig. 3, no shock absorbing device is employed and the spring perch is connected with the vehicle spring in the usual way by a link 31.

The two projecting end portions 27, 28, of the bracket 24, are provided with studs 32 and 33. These studs extend horizontally outward in front of and in rear of the disk 10, respectively. The stud 32 provides a support for one end of the friction band 16 and also serves as a pivot upon which the operating lever 25 swings. As shown, an end plate 34 having a pair of laterally separated eyes 35, 36, formed thereon, is secured to the friction band 16 in position for the reception of the stud 32 through the eyes 35, 36. The operating lever 25 is mounted on the stud 32 between the eyes 35, 36, of the end plate 34, and the parts are held in this assembled position upon the stud in any convenient manner, as by the insertion of a cotter 37 through the stud 32 adjacent its outer end. Preferably the length of the friction band 16, extends away from the stud 32 in the same direction with the rotation of the vehicle wheel 15 during forward movement of the vehicle, indicated by the arrow 48 on Fig. 1.

The operating lever 25 takes the form of a bell crank having arms 38, 39, of unequal length. It is so mounted upon the stud 32 that in its normal position its longer arm 38, is depending, while its shorter arm 39 is inclined upwardly and rearwardly from the stud. A rod 40 is connected with the lower end of the longer arm 38 and extends to any convenient operating means, as for example, a foot pedal (not shown). An eye bolt 41 is attached to the shorter arm 39 of the lever 25 for adjustable connection with the loose end of the friction band 16. As shown, the said end of the friction band 16 is turned into a loop 42 and the stem of the eye bolt 41 projects through this loop. Nuts 43 and 44 run upon the stem of the eye bolt 41 and bear upon the loop 42.

The construction provides that the swinging of the operating lever 25 serves to draw the loose end of the friction band 16 downwardly and inwardly for tightening the band upon the drum 10. Furthermore, this tightening movement of the band is in the same direction with the rotation of the drum 10 during the forward movement of the vehicle. The tightening of the band upon the drum by the swinging of the operating lever 25 is accordingly assisted by the frictional engagement of the rotating drum with the band. It will be understood that the band 16 will ordinarily take the form of a metal strap with any well known form of brake lining 45 applied thereto upon the inside.

The stud 33 serves for guidedly supporting the intermediate part of the friction band 16. As shown, a bracket plate 46 is secured against the brake band 16 and this bracket is provided with an inclined slot 47 for slidingly receiving the stud. If desired, a set screw 48 may enter the slot 47 from one end to serve as an adjustable stop for limiting the movement of the friction band on the stud. As the adjacent portion of the friction band 16 is moved upwardly by the downward pull of the operating lever 25 upon the loose end of the band, there is a cam engagement of the stud 33 with the walls of the slot 47, which insures an inward movement of the band toward the drum. Similarly, when the operating lever 25 is released, the intermediate part of the friction band 16 moves downwardly, by gravity, and the cam engagement of the stud 33 with the walls of the slot 47 provides a positive movement of the friction band away from the rim of the drum. The so-called "dragging of the brake" during the normal operation of the vehicle is accordingly prevented.

It will be understood that the arm 29 of the bracket 24 may be suitably proportioned for the interposition of any form of shock absorbing device 30 between the vehicle spring 23 and the arm. Furthermore, the arching shape of the bracket 24 and its engagement by the several connecting bolts 20, 21 and 22 insures a rigid form of construction adapted to efficiently serve both the function of a perch for connection with the vehicle spring and as a mounting for the improved form of service brake.

I claim as my invention,—

1. In a vehicle brake, in combination, a drum turning with the vehicle wheel, a friction band extending about the drum, one end of the band being fixed, straining means connected with the other end of the band, and means having a cam engagement with the band intermediate its ends for moving the adjacent part of the band toward the drum when the band is tightened by the said straining means, and for moving the adjacent part of the band away from the drum when the straining means is released.

2. In a vehicle brake, in combination, a drum turning with the vehicle wheel, a pair of fixed studs extending transversely over the drum at diametrically opposite points, a friction band having one end attached to one of the studs to prevent movement of the said end of the band about the drum and the remainder of the band extending about the drum in the direction of its rotation during forward movement of the vehicle, an intermediate part of the band being provided with a cam slot which is inclined to the radius of the drum and slidingly receives the other stud, an operating lever having a fixed pivot and connection between the operating lever and the other end of the friction band.

3. The combination with a vehicle having an axle, a wheel mounted upon the end of the axle and a tubular axle housing with a flanged end adjacent the wheel, of a drum located between the wheel and the flanged end of the axle housing, said drum being secured against the wheel to rotate therewith, a bracket secured against the flanged end of the axle housing and having an arm adapted to serve as a perch for connection with the vehicle spring, a pair of studs fixed in the bracket, one of said studs extending transversely in front of the drum and the other stud extending transversely in rear of the drum, a friction band having one end connected with one of the studs and extending therefrom about the drum in the direction of rotation of the drum during forward movement of the vehicle, an intermediate part of the band being provided with a cam slot which is inclined to the radius of the drum and slidingly receives the other stud, an operating lever pivotally mounted on the bracket and connection between the operating lever and the other end of the friction band.

4. The combination with a vehicle having an axle, a wheel mounted upon the end of the axle and a tubular axle housing with a flanged end adjacent the wheel, of a drum located between the wheel and the flanged end of the axle housing, said drum being secured against the wheel to rotate therewith, a bracket secured against the flanged end of the axle housing and having an arm adapted to serve as a perch for connection with a vehicle spring, a stud fixed in the bracket and extending transversely in front of the drum, a friction band having one end connected with the said stud and extending therefrom about the drum in the direction of rotation of the drum during forward movement of the vehicle, an operating lever pivotally mounted on the bracket, and connection between the operating lever and the other end of the friction band.

5. In a vehicle brake, in combination, a drum turning with the vehicle wheel, a friction band extending about the drum, straining means operable upon the band to effect a relative movement of the two ends of the band at one side of the drum and a longitudinal shifting of an intermediate part of the band at the opposite side of the drum, and means having a cam engagement with the said intermediate part of the band for moving it toward and away from the drum when longitudinally shifted by the said straining means.

FREDERICK DENMAN.

Copies of this patent may be obtained for five cents each, by addressing the "Commissioner of Patents, Washington, D. C."